US009305162B2

(12) United States Patent
Yuen et al.

(10) Patent No.: US 9,305,162 B2
(45) Date of Patent: Apr. 5, 2016

(54) CENTRALIZED SELECTIVE APPLICATION APPROVAL FOR MOBILE DEVICES

(71) Applicant: Fixmo, Inc., Toronto (CA)

(72) Inventors: Chun Fung Yuen, Mississauga (CA); Wing Young Lam, Markham (CA); Richard Segal, Toronto (CA); Alex Lau, Markham (CA)

(73) Assignee: GOOD TECHNOLOGY CORPORATION, Sunnyvale, CA (US)

( * ) Notice: Subject to any disclaimer, the term of this patent is extended or adjusted under 35 U.S.C. 154(b) by 0 days.

(21) Appl. No.: 13/955,622

(22) Filed: Jul. 31, 2013

(65) Prior Publication Data

US 2015/0040246 A1 Feb. 5, 2015

(51) Int. Cl.
| | |
|---|---|
| *H04L 29/06* | (2006.01) |
| *G06F 21/51* | (2013.01) |
| *G06F 21/50* | (2013.01) |
| *H04W 12/10* | (2009.01) |
| *H04W 4/00* | (2009.01) |

(52) U.S. Cl.
CPC ............... *G06F 21/51* (2013.01); *G06F 21/50* (2013.01); *H04L 63/168* (2013.01); *H04L 63/20* (2013.01); *H04W 4/00* (2013.01); *H04W 12/10* (2013.01)

(58) Field of Classification Search
CPC ................................ H04L 63/20; H04L 63/12
USPC .......................................................... 726/30
See application file for complete search history.

(56) References Cited

U.S. PATENT DOCUMENTS

| | | | | |
|---|---|---|---|---|
| 7,168,089 | B2* | 1/2007 | Nguyen et al. | 726/4 |
| 7,694,296 | B1 | 4/2010 | Kennedy | |
| 2004/0203693 | A1* | 10/2004 | Mehta et al. | 455/419 |

(Continued)

FOREIGN PATENT DOCUMENTS

| | | |
|---|---|---|
| WO | 2012027588 A1 | 3/2012 |
| WO | 2014017118 A1 | 1/2014 |
| WO | 2014055354 A1 | 4/2014 |

OTHER PUBLICATIONS

International Search Report and Written Opinion issued Nov. 27, 2014 on related PCT Application No. PCT/US2014/048968 filed Jul. 30, 2014.

*Primary Examiner* — Shawnchoy Rahman
(74) *Attorney, Agent, or Firm* — EIP US LLP

(57) ABSTRACT

A system and method for confirming an application change event associated with a device infrastructure of a mobile device, the method comprising the steps of: storing an application authorization list identifying a plurality of mobile applications, the application authorization list being remote from the mobile device over a communications network; receiving an application authorization request from the mobile device over the communications network, the application authorization request including application identification information; comparing the application identification information with one or more listed mobile applications of the plurality of mobile applications identified in the application authorization list; determining whether the application information matches any of the plurality of mobile applications to produce a decision instruction containing an authorization decision; and sending the decision instruction to the mobile device for subsequent processing of the decision instruction by a mobile agent associated with the device infrastructure; wherein processing of the decision instruction provides for confirmation of the application change event.

18 Claims, 5 Drawing Sheets

(56) References Cited

U.S. PATENT DOCUMENTS

| | | | |
|---|---|---|---|
| 2007/0260874 A1* | 11/2007 | Adams | H04L 63/0823 713/156 |
| 2008/0051076 A1* | 2/2008 | O'Shaughnessy | G06F 21/305 455/419 |
| 2008/0052383 A1* | 2/2008 | O'Shaughnessy et al. | 709/223 |
| 2009/0279701 A1* | 11/2009 | Moisand | H04L 12/185 380/270 |
| 2013/0054702 A1 | 2/2013 | Belchee et al. | |
| 2013/0097660 A1 | 4/2013 | Das et al. | |
| 2014/0298420 A1* | 10/2014 | Barton et al. | 726/4 |

* cited by examiner

CENTRALIZED SELECTIVE APPLICATION APPROVAL FOR MOBILE DEVICES

FIELD

The present invention relates to computer device security.

BACKGROUND

Exploitation of computing devices is an ever increasing problem in today's mobile workforce environment, particularly in an environment where mobile devices are increasingly being used for both work and personal activities. Further, efficient and timely detection of exploited devices is commonly masked, due to various exploitation masking utilities and masking functionality of unauthorized applications present on the exploited device, thereby making management of application installed on mobile devices critically important for modern businesses.

Traditionally, an administrator approves of applications installed on desktop computers by means of an application whitelist or blacklist. At the time of enforcement or authorization for applications with respect to the desktop computer device, onboard/local memory and associated local processors of the desktop computer are involved using a copy of the blacklist and/or whitelist itself residing in the local memory of the desktop computer. As such, the blacklist and/or whitelist list is stored and interrogated locally when a comparison is done against desktop installed applications to determine whether an application is approved or not.

Also, the application of heuristics scanning can be used on desktop computers to discover malwares. In terms of whitelists usage, the application whitelist is distributed to desktop devices that are being administered and then stored in local memory of the desktop device. This model has worked well on desktop computers because business-dedicated desktop machines do not need extensive whitelists because the number of approved applications for the typical business enterprise can be limited and controlled. Further, business-dedicated desktop machines in an enterprise can be characterized by the lack of variations, thus there is no need to keep track of per desktop device application blacklist/whitelist. Further, desktop computers have the computation power, local storage capacity, network bandwidth and power capacity (e.g. line power) to perform application authorization by means of application whitelists/blacklists. However, in the case of mobile devices, the ability to use extensive and comprehensive application whitelist/blacklists can be limited by battery life, computational power, local storage capacity, and metered mobile network bandwidth.

In terms of heuristics scanning, business enterprises make use of heuristics scanning for desktop computers, as there can be many variations of malwares making heuristics scanning necessary. In this regard, desktop computers have the computation power, network bandwidth and battery capacity to perform heuristics scanning. Desktop computers also usually are equipped with unmetered network bandwidth and sufficient local storage capacity to make use of long and extensive application whitelists/blacklists when necessary.

However, the same model for heuristics scanning and application whitelists/blacklists does not work well for monitoring application installation on mobile devices, such as smart phones, because these mobile devices are not business-dedicated devices, i.e. are used for both personal and business activities, thereby making the monitoring and approval of a large number of non-business applications necessary. In particular, these non-business-dedicated mobile devices, as a group of devices managed by a central enterprise, can have an extreme degree of variation in terms of what applications are installed on what mobile device, thereby making it a challenge to keep track of individual application blacklists and whitelists associated with individual mobile devices.

In theory, the existence of official, canonical sources for easily enumerable applications can it make an application whitelist/blacklist model substantially attractive for mobile devices, rather than heuristic scanning, due to the lack of proliferation of many unknown variations of malwares. Also, the need to disapprove non-infected software in some organizations means heuristics scanning would simply not work in these cases. However, the ability to perform heuristic scans and the use of complete and extensive individual device application whitelist/blacklists are disadvantageous for collections of mobile devices due to limited battery life, limited onboard mobile device computational power, limited onboard mobile device storage, and mobile device metered bandwidth limits and costs for mobile network data usage. Further, frequent updates of mobile applications also renders frequent transfers of application blacklists and whitelists to individual mobile devices impractical.

Further, it is recognized that in the event of an exploited status (e.g. having the installation of a restricted application) of a mobile device in communication with one network service, other independent network services may not be aware of this exploited status (e.g. may not be able to detect or identify the exploited status via their network communications with the errant mobile device) and may therefore put the security of their enterprise data at risk. As such, local enforcements on the mobile device can be bypassed or the whitelist/blacklist can become adversely exposed if the device has undergone a privilege escalation attack (e.g. jailbreaking, rooting), this can be regardless whether the device is a traditional computer or a handheld device such as a mobile phone. However, this aspect is of particular importance for handheld devices due to the popularity of such attacks among even ordinary users in the BYOD (Bring Your Own Device) scenario.

It is also recognized that mobile devices may not be always have stable network connections, and thus may not be connected to the untrusted networks (e.g. WiFi hotspot, hostile 3G network). Further, a difference between desktop computers vs mobile devices is that desktop computers typically reside behind a firewall and thus network-based solutions using locally stored (at the desktop device storage) lists can be deployed to catch unauthorized downloads. The same is not possible for mobile devices as can not protected by firewalls.

SUMMARY

An object of the present invention is to provide a mobile device application approval method and system to obviate or mitigate at least one of the above-presented disadvantages.

A first aspect provided is a method for confirming an application change event associated with a device infrastructure of a mobile device, the method comprising the steps of: identifying the application change event processed by the device infrastructure; sending an application authorization request from the mobile device over a communications network, the application authorization request including application identification information, receiving a decision instruction for processing of the decision instruction by a mobile agent associated with the device infrastructure, the decision instruction based on a comparison of the application identification information with one or more listed mobile applications of a plurality of mobile applications identified in an application authorization list, the application authorization being remote from the mobile device over the communications network; and processing an authorisation decision of the decision instruction, the authorization decision based on whether the application identification information matches any of the plurality of mobile in applications order to perform at least one of approve or deny of the application change event.

A second aspect provided is a method for confirming an application change event associated with a device infrastructure of a mobile device, the method comprising the steps of: storing an application authorization list identifying a plurality of mobile applications, the application authorization list being remote from the mobile device over a communications network; receiving an application authorization request from the mobile device over the communications network, the application authorization request including application identification information; comparing the application identification information with one or more listed mobile applications of the plurality of mobile applications identified in the application authorization list; determining whether the application information matches any of the plurality of mobile applications to produce a decision instruction containing an authorisation decision; and sending the decision instruction to the mobile device for subsequent processing of the decision instruction by a mobile agent associated with the device infrastructure; wherein processing of the decision instruction provides for confirmation of the application change event.

BRIEF DESCRIPTION OF THE DRAWINGS

The foregoing and other aspects will be more readily appreciated having reference to the drawings, wherein.

DESCRIPTION

The claimed invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the claimed invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the claimed invention is provided below along with accompanying figures that illustrate the principles of the invention. The claimed invention is described in connection with such embodiments, but the claimed invention is not limited to any embodiment. The scope of the claimed invention is limited only by the claims and the claimed invention encompasses numerous alternatives, modifications and equivalents. Numerous specific details are set forth in the following description in order to provide a thorough understanding of the claimed invention. These details are provided for the purpose of example and the invention may be practiced according to the claims without some or all of these specific details. For the purpose of clarity, technical material that is known in the technical fields related to the claimed invention has not been described in detail so that the claimed invention is not unnecessarily obscured.

In this specification and in the claims, the use of the article "a", "an", or "the" in reference to an item is not intended to exclude the possibility of including a plurality of the item in some embodiments. It will be apparent to one skilled in the art in at least some instances in this specification and the attached claims that it would be possible to include a plurality of the item in at least some embodiments.

Mobile Device and Server Environment 8

Figure 1:
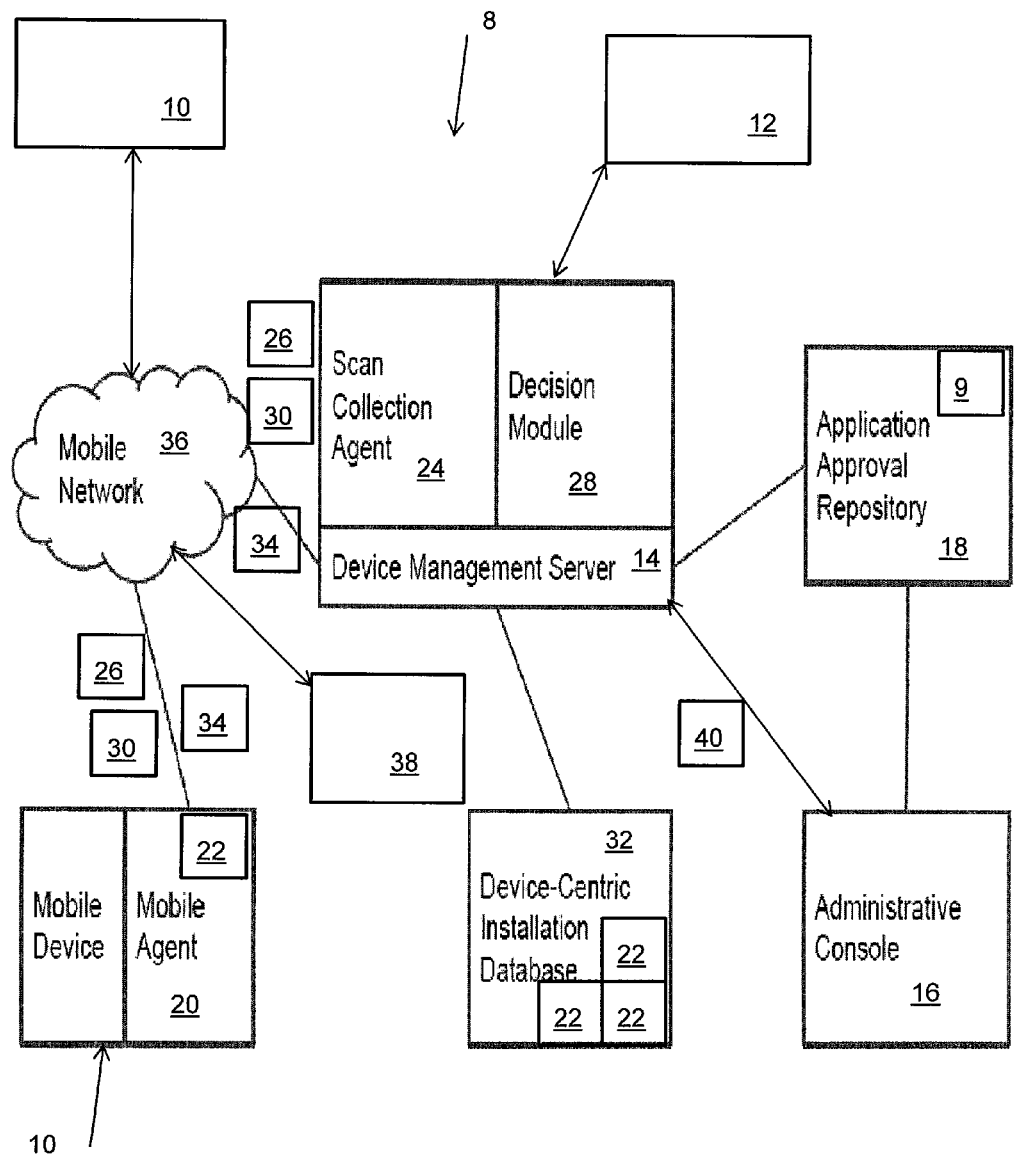
FIG. 1 is a view of a network system.

Referring to FIG. 1, shown is an environment 8 facilitating the maintenance of administrator-controlled, server-side application whitelists 9 providing a list of mobile applications (e.g. selected executable programs and/or applicable software libraries (DLLs)) allowed for installation (or disallowed for removal) on mobile devices 10 (i.e. mobile device to be managed), and/or application blacklists 9 providing a list of mobile applications restricted for installation on mobile devices 10 and can also provide for required applications that should be installed/present on mobile device 10 and therefore are not authorized for removal once approved of and installed via a mobile device administrator via a device management server 14. Mobile devices 10 are in communication with the device management server 14 of a business enterprise 12 associated with mobile devices 10. For example, device management server 14 can be a third party server in communication with business enterprise 12 or can be administered directly by business enterprise 12. Advantages of environment 8, as further discussed below, can include: reduced or eliminated transferring of application blacklists 9 and whitelists 9, hereafter referred to collectively as application authorization lists 9, beyond what is used by mobile devices; and/or limiting or otherwise eliminating storing individual complete application authorization lists 9 locally in onboard storage of mobile devices 10. It is recognize that a subset of application whitelist 9 is a "required" list of mobile applications, which is used to inform mobile agent 20 by decision module 28 to disallow un-installation or removal of the "required" application.

It is recognized that, as further described below, at the time of enforcement or authorization for mobile applications installed on mobile device 10 (or inappropriately removed from, i.e. uninstalled, from mobile device 10), remote memory and associated processors of device management server 14 are involved using stored application blacklist and/or whitelist 9 residing in remote memory (i.e. geographically remote from the mobile device 10 and as such any interaction between the device management server 14 and mobile device 10 occurs via network 36) of device management server 14. As such, application blacklist and/or whitelist list 9 is stored remote from mobile device 10 and is interrogated locally by device management server 14 when a comparison is done against mobile device 10 application changes (e.g. installed or removed) to determine whether a mobile application installation/removal is approved or not. It is also recognized that messaging 26,30,34 between device management server 14 and mobile device 10 can be implemented via a wired connection when mobile device 10 is tethered (via a physical tether) to device management server 14 directly or indirectly via an intermediate network device such as a desktop computer present on the wired network. For example, mobile device 10 could be connected to a desktop device via a USB port of the desktop device. As such, any messages 26,30,34 would be communicated between tethered mobile device 10 and device management server 14 via USB tether and intermediate desktop device. As such, the network 36 connection used for communications 26,30,34 would be network connection 36 between desktop device and device management server 14 rather than between device management server 14 and mobile device 10.

As further discussed below, comparison of one or more applications changed (e.g. installed or removed) on mobile device 10 against contents of application blacklist and/or whitelist 9 is referred to as an application change confirmation event. The application change confirmation event can refer to confirming (via comparison of application against the remote application list 9 by decision module 28 in communication with mobile agent 20) if a newly installed mobile application is authorized for installation (in whole or in part) on mobile device infrastructure.

The application change confirmation event can refer to confirming (via comparison of application against the remote application list 9 by decision module 28 in communication with mobile agent 20) if a previously installed mobile application is authorized for continuing installation (in whole or in part) on mobile device infrastructure.

The application change confirmation event can refer to confirming (via comparison of application against the remote application list 9 by decision module 28 in communication with mobile agent 20) if a mobile application is authorized for removal (in whole or in part) from mobile device infrastructure.

The application change confirmation event can refer to confirming (via comparison of application against the remote application list 9 by decision module 28 in communication with mobile agent 20) if an about to be installed mobile application is authorized for installation (in whole or in part) on mobile device infrastructure. As such, the process of application quarantining or disabling can also refer to any variation of the concept of "pending approval" of an application that the user wishes to install/update on mobile device infrastructure 23. For example, if instead of quarantining a newly installed application by mobile agent 20, mobile agent 20 simply does not allow the user (via the user interface 27) and/or device infrastructure 23 to install the application based on instructions received via the user interface 27 (or other third party agent in local memory or remote acceded over the network 36) but sends the request message to device management server 14 to get this application approved before installation as an executable application on device infrastructure.

The application change confirmation event can refer to confirming (via comparison of application against the remote application list 9 by decision module 28 in communication with mobile agent 20) if an already installed mobile application is authorized for continuing installation (in whole or in part) on mobile device infrastructure 23. For example, in this case installation and possible execution by device infrastructure 23 is permitted (or otherwise not restricted) by mobile agent 20 but then mobile agent 20 contacts decision module 28 asking for application authorization, as discussed herein. If the return decision from decision module 28 is "not approved", then mobile agent 20 can take steps to remove (or disable) the installed application as discussed herein. Alternatively, the already installed and executed application can be disabled (e.g. as discussed herein) before, during, and/or after contacting decision module 28 by mobile agent 20.

As such it is recognized that the application change confirmation event can be used to confirm the presence of a portion of a mobile application with respect to device infrastructure of mobile device 10 being interrogated by decision module 28 and/or mobile agent 20. As such it is recognized that the application change confirmation event can be used to confirm the presence of all of a mobile application with respect to device infrastructure of mobile device 10 being interrogated by decision module 28 and/or mobile agent 20. As such it is recognized that the application change confirmation event can be used to confirm the absence of a portion of a mobile application with respect to device infrastructure of mobile device 10 being interrogated by decision module 28 and/or mobile agent 20. As such it is recognized that the application change confirmation event can be used to confirm the absence of all of a mobile application with respect to device infrastructure of mobile device 10 being interrogated by decision module 28 and/or mobile agent 20.

As such, operation of device management server 14 in conjunction with a mobile agent 20 can provide for: identification of specific mobile program executables and/or software libraries which should be permitted to execute on a given mobile device 10 system; inhibiting any other mobile executables and/or software libraries from functioning on that mobile device 10 system; inhibiting mobile device users from being able to change which authorized files (e.g. program executable and/or software libraries) can be executed on the mobile device system; installation and un-installation or removal of entire software applications from device infrastructure of mobile device 10, such as installation of software application if the application is on the required list (e.g. application whitelist 9) and/or un-installation of software application if the application is on application blacklist 9; disallowing un-installation of software applications if application whitelist 9 comes with a flag indicating that the mobile application is required and should be present and installed on device infrastructure; installation or removal installation of whole or part of mobile applications, e.g. in Android an application can be split into different parts and as such individual parts can also be enabled, disabled based on a server-side application authorization list 9; and/or device management server 14 can receive real-time events as software applications (or component parts thereof) are being installed and/or removed and/or enabled and/or disabled as identified and reported by mobile agent 20. As such, device management server 14 (e.g. decision module 28) can be configured to provide installation authorization or rejection decisions based on reporting for installation (or removal events) from mobile agent 20, as reported via network 36 as further described below.

Referring again to FIG. 1, environment 8 can include an Administrative Console 16 configured as a frontend component that lets a mobile device administrator (not shown) alter approval status of mobile applications contained in the application authorization lists 9. An Application Approval Repository 18 keeps track of mobile applications and their approval status as per the application authorization lists 9. In the Application Approval Repository 18, the application information associated with the application authorization list(s) 9 can include the identification of a software application or components, for example a software application can be identified by its native id, version, and/or a cryptographically calculated hash of (whole or part of) the application payload. Each mobile device 10 is configured with Mobile Agent 20 for managing content of an installed application list 22, containing identification of all mobile applications presently installed (and/or removed) on mobile device 10, for reporting to a Scan Collection Agent 24 of the server 14, and for acting on authorization results 26 communicated to mobile device 10 from a Decision Module 28 based on an initial application change (e.g. install or remove) request 30. It is also recognized that a required status can be sent to device 10 at the time of sending the authorization results 26, thereby facilitating that a required list 9 can be a sublist of the whitelist. As such, the required list 9 can be a list of applications defined as required to be present and installed on device infrastructure 23.

Device management server 14 can be configured individually or as a combination of scan collection agent 24 and decision module 28. Scan collection agent 24 is configured to collect installed application lists 22 from each mobile agent 20 of each mobile device 10 administered by device management server 14 and to keep a device-centric installation database 32 up-to-date. The installed (and/or removed) application list 22 for each of mobile devices 10 can be periodically collected by scan collection agent 24 in connection with mobile agent 20 as well as updated when changes are detected by the mobile agent 20. Decision module 28 is configured to make decisions on how to respond to application change request 30, based on the contents of device-centric installation database 32 and/or application approval repository 18.

Device-centric installation database 32 provides to device management server 14 (e.g. via decision module 28) knowledge about what mobile applications and/or software libraries are installed (and/or are absent or removed) on the mobile devices 10 administered by device management server 14. Application Approval Repository 18 keeps track of mobile applications and/or software libraries and their approval status as per the application authorization lists 9, such that the content of application approval lists 9 is a combination of all application lists 22 periodically collected (e.g. received or otherwise transmitted) from each mobile agent 20 of each of mobile devices 10 of environment 8. It is recognized that device-centric installation database 32 and application approval repository 18 can be the same storage or different storages. Further, it is recognized that device-centric installation database 32 and associated application list 22 can be optional in environment 8.

Device 10 and Server 14 Network Interaction

As shown in FIG. 1, Mobile Network 36 represents one or more communication channels between mobile agents 20 and device management server 14. For example, mobile agents 20 are in a client-server relationship with device management server 14. Mobile device 10 can be a computing device 10 employed by a device user (e.g. a personal computing device). Examples of the device 10 can include such as but not limited to: a mobile device; a smart phone, a wireless phone; a PDA; a tablet; and/or other handheld computer device that is connected to the network 36 via a wireless connection. The network 36 can include wired and/or wireless network segments/routes, depending on how mobile device 10 is configured to interact with device management server 14 (e.g. tethered and/or untethered).

For example, any or all of device management servers 14 can be enterprise servers. As such, device management servers 14 can be represented by physical computer devices (e.g. a configured computer hardware system) dedicated to run one or more services (e.g. as a host of the services) to serve the needs of the users of mobile devices 10 (and application(s)—e.g. mobile agent 20—affiliated with respective server 14) on the network 36. Depending on the computing service (e.g. data processing, data access, etc.) that the server 14 offers, server 14 could be a database server, file server, mail server, print server, web server, gaming server, or some other kind of server. In the context of client-server architecture, server 14 can be defined as a computer program running to serve the requests of other programs, the "clients". Thus, the "server" performs some computational task (including data access to data accessible via the server 14—e.g. in server storage 18,32) on behalf of "clients". In the present context, the clients (coordinating mobile device 10 access and communication with server 14) run on mobile device 10 and connect through network 36 with server 14 affiliated with the client application. It is recognized that the relationship of the client application with it's affiliated server 14 is typically done on a one-to-one basis.

As such, server 14 capable of acting as a network server for device 10 can contain features (e.g. hardware, software, network connectivity) making server 14 more suitable for production environments over the features of the device 10. These features can include a faster CPU, increased high-performance RAM, and increased storage capacity in the form of a larger or multiple hard drives, as compared to such features typically had by personal devices 10. Servers 14 can also have reliability, availability and serviceability (RAS) and fault tolerance features, such as redundancy in power supplies, storage (as in RAID), and network 36 connections.

Preferably, the communications network 36 comprises a wide area network such as the Internet, however the network 36 may also comprise one or more local area networks 36, one or more wide area networks, or a combination thereof. Further, the network 36 need not be a land-based network, but instead may comprise a wireless network and/or a hybrid of a land-based network and a wireless network for enhanced communications flexibility. The communications network 36 is used to facilitate network interaction between devices 10 and server 14. The communications network 36 is used to facilitate network interaction between server 14 and storages 18,32 (when configured remotely). In terms of communications (e.g. 26,30,34) on network 36, these communications can be between the computer devices (e.g. device 10 and device 14) consisting of addressable network packages following a network communication protocol (e.g. TCPIP), such that the communications can include application and/or software library identification information (and authorization information thereof) communicated using appropriate predefined encryption as used between device 10 infrastructure and a secure enterprise mobile services gateway or server (e.g. remote computer device 14). As discussed below, the application and/or software library identification information (and authorization information thereof) is representative of application installation control for applications and/or software library installed and executable on mobile device 10.

It is recognized that mobile devices 10 may not be always have stable network connections, and thus may be connected to network 36 acting as an untrusted or unsecured network (e.g. WiFi hotspot, hostile 3G network).

Application Authorization Example

Figure 2A:
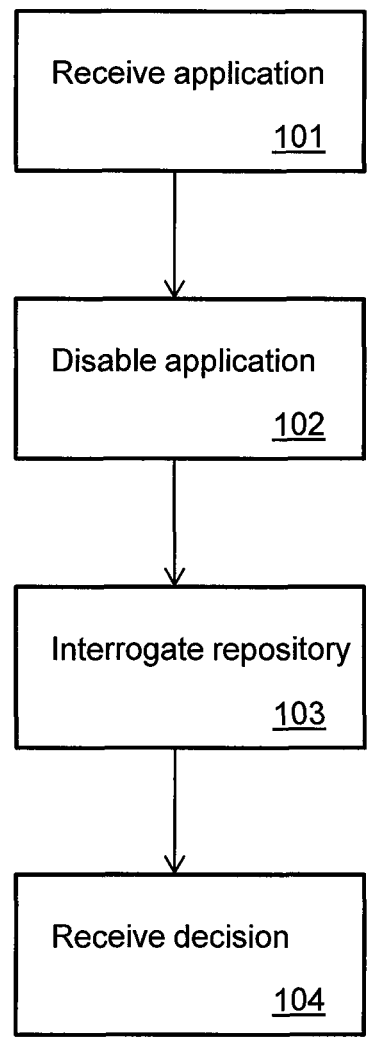
FIG. 2a shows an operational example of the network system of FIG. 1.
Figure 3:
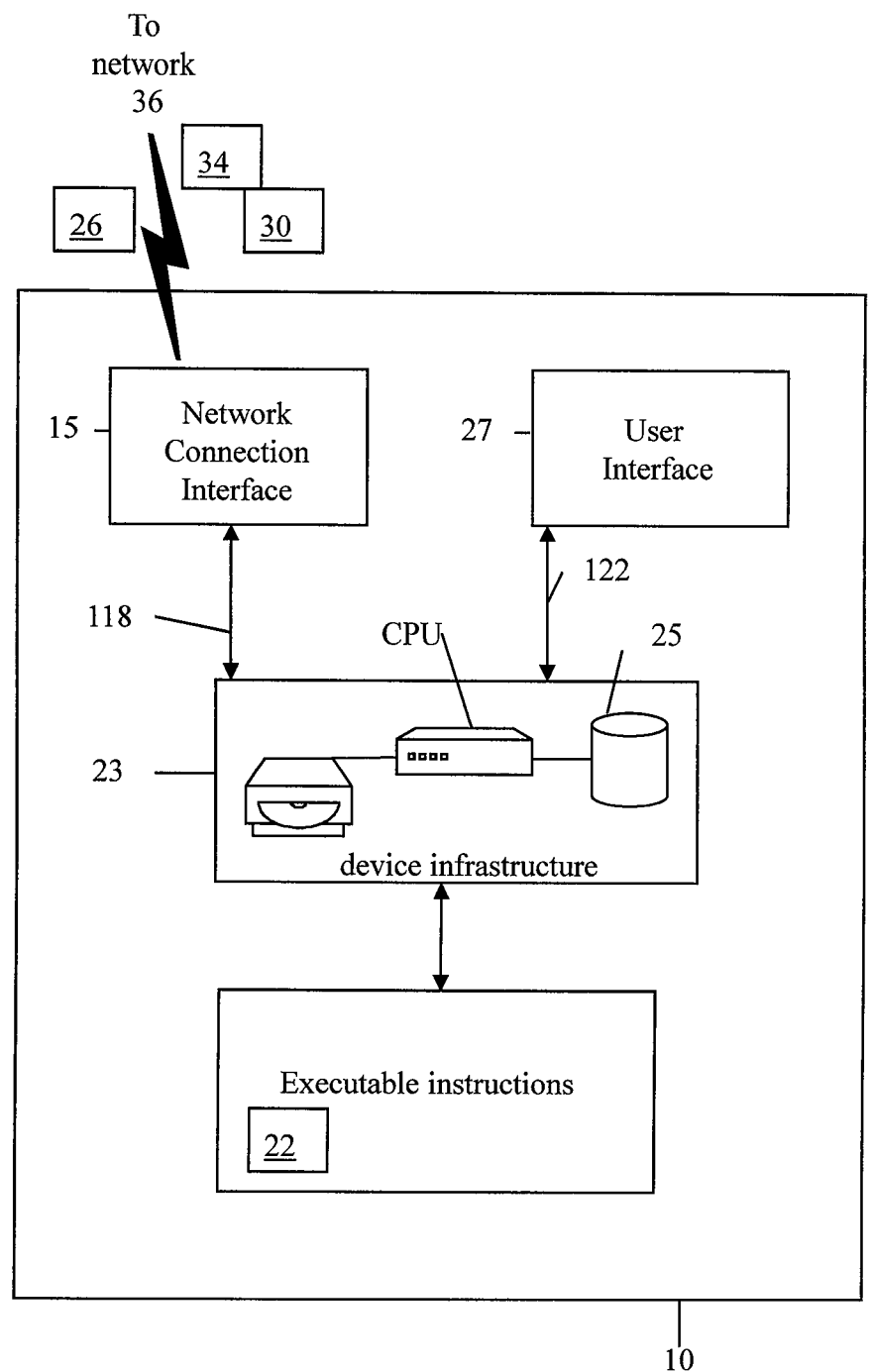
FIG. 3 shows an example configuration of a mobile device of the system of FIG. 1.

Referring to FIG. 1 and FIG. 2a, at step 101 upon receiving application change (e.g. install or remove such as downloading from a file repository, for example Google™ play store or Apple™ app store) or update (e.g. new application version) of an application, mobile agent 20 identifies via an operating system of mobile device 10 that the application was changed (e.g. installed or removed) for subsequent execution on mobile application 10 by device infrastructure 23 (see FIG. 3). For example, mobile agent 20 could be operating in the background on mobile device 10 listening for an application change event as processed by the operating system of device infrastructure 23.

At step 102, mobile agent 20 first disables the newly installed application (e.g. executable application), once identified, so that the newly installed application cannot be run or visible (application is said to be quarantined) by device infrastructure 23, and sends application approval request 30 to device management server 14 containing identification information about the newly-installed application. For example, the newly installed application could be disabled after installation before being run/executed for the first time by device infrastructure 23. Alternatively, at step 102, mobile agent 20 first identifies the newly removed application (e.g. executable application) by device infrastructure 23, and sends application approval request 30 to device management server 14 containing identification information about the removed application. As such, application removal may already have taken place and therefore approval request 30 may be optional. However update information 36 can be sent to server 14 by mobile device 10 for informational purposes as stored in list(s) 9, 22, as desired.

One example means for disabling (i.e. not allowing user of the mobile device 10 to access and execute) of the newly installed application is for mobile agent to move storage of the newly installed application to a quarantine storage location (e.g. selected quarantine directory) of device infrastructure 23 that is separate from storage locations of already authorized (and thus currently executable) applications installed on the device infrastructure 23 of mobile device 10. Another example means for disabling is by mobile agent 20 to disable or otherwise redirect a system of function call associated with the newly installed application, such that mobile agent 20 would not allow the system of function call issued by the operating system of the device infrastructure 2 to be received by the newly installed application. Another example means is by mobile agent 20 to disable operation or otherwise hide (e.g. grayed out) of a user interface 27 icon (see FIG. 3) associated with the newly installed application, such that mobile agent 20 would not allow the user of mobile device 10 to operate the icon and thus generate a system of function call for receipt by the newly installed application. Another example means for disabling is by mobile agent 20 to create a hook for the operating system of device infrastructure 23 into mobile agent 20 immediately before executing the installed application. The mobile agent 20 would then deny the running of the installed application by telling the operating system that it is not allowed as a return result of that hook. Another example means for disabling is by mobile agent 20 is to detect the immediate execution of the software component of installed application, but place a blocking screen on top so user interface 27 (see FIG. 3) of the installed application cannot be accessed by the user via the user interface 27. For example, this disabling means example is performed while at least a part of the installed application is executed by device infrastructure 23. Further, for example, this disabling means can be used for blacklisting of non-malware applications installed on device infrastructure 23.

The identification information of application approval request 30 could contain application name, application version, and location of application install (e.g. directory) in device infrastructure 23. The purpose of the identification information contents is to contain enough information such that decision module 28 can uniquely identify the changed (e.g. installed or removed) application. One example form of the identification information is a hash value representing the newly installed application, which can be obtained (e.g. by decision module 28) by performing a binary scan of the changed (e.g. installed or removed) application. As such, hashing is the transformation of a string of characters uniquely representative of the changed (e.g. installed or removed) application into a usually shorter fixed-length value or key that represents the original string. For example, only the application characters for application name, application version, and location of application install (e.g. directory) in device infrastructure 23 could be hashed.

As provided for above, to the end user of mobile device 10, the changed (e.g. installed) application at this stage could appear as if it had not been installed, except that mobile agent 20 could notify the user via user interface 27 with a message saying that the newly installed application is put under quarantine until further notice.

At step 103, decision module 28 receives request 30 and interrogates application approval repository 18 to determine if the application identification information of the request 30 matches one of the applications contained in the authorization application list 9. For example, if authorization application list 9 is a whitelist and there is a match then decision module 28 sends application decision 26 back to mobile agent 20 indicating that the newly installed application is authorized. For example, if authorization application list 9 is a whitelist and there is no match then decision module 28 sends application decision 26 back to mobile agent 20 indicating that the newly installed application is not authorized. For example, if authorization application list 9 is a blacklist and there is a match then decision module 28 sends application decision 26 back to mobile agent 20 indicating that the newly installed application is not authorized. For example, if authorization application list 9 is a blacklist and there is no match then decision module 28 sends application decision 26 back to mobile agent 20 indicating that the newly installed application is authorized. Alternatively, in the case where there is no match (either whitelist or blacklist), then the decision module 28 can send a review request 40 to administration console 16 asking for confirmation of authorization or restriction for the newly installed application. In any event, based on the actions and resulting decision of the decision module 28, application decision 26 either contains an authorization instruction, a restriction or non authorization instruction, or a pending instruction or a required instruction back to mobile agent 20. Also, it is recognized that as newly installed application is detected to be not in the application approval list 9, an alert email could be optionally sent to administrator console 16 and/or through electronic mail.

Alternatively at step 103, decision module 28 receives request 30 and interrogates application approval repository 18 to determine if the application identification information of the request 30 matches one of the applications contained in the authorization application list 9. For example, if authorization application list 9 is a whitelist and there is a match then decision module 28 sends application decision 26 back to mobile agent 20 indicating that the removed application is not authorized. For example, if authorization application list 9 is a whitelist and there is no match then decision module 28 sends application decision 26 back to mobile agent 20 indicating that the newly removed application is authorized. For example, if authorization application list 9 is a blacklist and there is a match then decision module 28 sends application decision 26 back to mobile agent 20 indicating that the newly removed application is authorized. For example, if authorization application list 9 is a blacklist and there is no match then decision module 28 sends application decision 26 back to mobile agent 20 indicating that the newly removed application is authorized. Alternatively, in the case where there is no match (either whitelist or blacklist), then the decision module 28 can send a review request 40 to administration console 16 asking for confirmation of authorization or restriction for the newly removed application. In any event, based on the actions and resulting decision of the decision module 28, application decision 26 either contains an authorization instruction, a restriction or non authorization instruction, or a pending instruction back to mobile agent 20. Also, it is recognized that as newly removed application is detected to be not in the application approval list 9, an alert email could be optionally sent to administrator console 16.

Alternatively at step 103, decision module 28 receives request 30 and interrogates application approval repository 18 to determine if the application identification information of the request 30 matches one of the applications contained in the authorization application list 9. For example, if authorization application list 9 is a required list and there is a match then decision module 28 sends application decision 26 back to mobile agent 20 indicating that the removed application is not authorized. For example, if authorization application list 9 is a required list and there is no match then decision module 28 sends application decision 26 back to mobile agent 20 indicating that the newly removed application is authorized. For example, if authorization application list 9 is a blacklist and there is a match then decision module 28 sends application decision 26 back to mobile agent 20 indicating that the newly removed application is authorized. For example, if authorization application list 9 is a blacklist and there is no match then decision module 28 sends application decision 26 back to mobile agent 20 indicating that the newly removed application is authorized. Alternatively, in the case where there is no match (either required list, whitelist or blacklist), then the decision module 28 can send a review request 40 to administration console 16 asking for confirmation of authorization or restriction for the newly removed application. In any event, based on the actions and resulting decision of the decision module 28, application decision 26 either contains an authorization instruction, a restriction or non authorization instruction, or a pending instruction or required instruction back to mobile agent 20. Also, it is recognized that as newly removed application is detected to be not in the application approval list 9, an alert email could be optionally sent to administrator console 16 or via electronic mail. As such, the required list content can contain lists of applications of which it is decided by the administrator that such required applications must be present (e.g. installed and executable) on device infrastructure 23.

As such, in view of the above it is recognized that comparison of the changed application against the application authorization list(s) 9 via the decision module 28 can be done for either or both application installation or removal events for applications on device infrastructure 23 of mobile device 10.

At step 104, mobile agent receives application decision 26 and acts on the contained application decision instructions. For example, if the application instruction in question is "pending", the newly installed application will remain disabled and quarantined. If the application instruction in question is "approved", the newly installed application will be reenabled (e.g. disabling mechanism implemented by mobile agent is reversed or otherwise deleted) and thereby executable by device infrastructure 23. In this case the newly installed application is said to be released from quarantine and thus usable by the user of mobile device 10. If the application instruction in question is "blacklisted", the newly installed application will be uninstalled from the device infrastructure 23 as coordinated by mobile agent 20. If the application instruction in question is "required", the newly installed application will be maintained in device infrastructure 23 as coordinated by mobile agent 20

It is also recognized that device management server 14 could reverse an authorized decision instruction and subsequently send a second application decision instruction 26 (e.g. unsolicited by mobile agent 20) containing a decision instruction to remove the previously approved installed application or to install an executable application a previously approved application removal by mobile agent 20 from device infrastructure 23 of mobile device 10. This could be the case where the list 9 contained in device centric database 32 indicates that mobile device(s) 10 contain(s) an installed application that has subsequently become blacklisted. As such, the advantage for this is that if the authorization/restriction status is detected to be updated outside of the mechanism, mobile agent 20 can immediately restore. This can be of particular use for "quarantined" and "required" applications, as users should be allowed to disable (non-required) applications. The re-enabling of quarantined applications and disabling of required applications could be monitored via decision module 28 in conjunction with mobile agent 20 via network 36 messaging 26,30,34 and the application status restored.

Figure 2B:
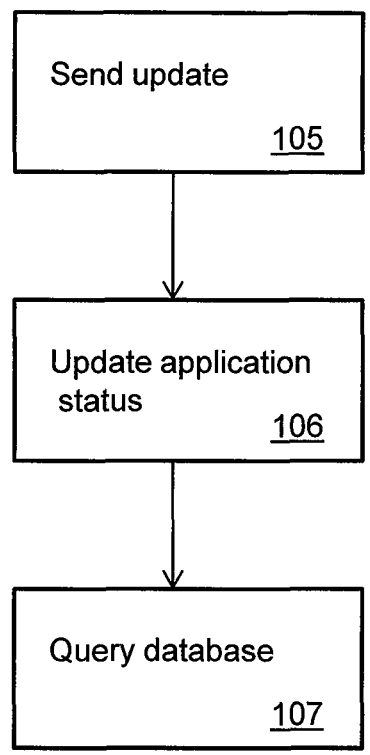
FIG. 2b shows a further operational example of the network system of FIG. 1.

Referring to FIG. 1 and FIG. 2b, at step 105 mobile agents 20 of mobile devices 10 also periodically send a respective full list 22 of applications installed on their respective device infrastructure 23, via update message 34, to help provide for device-centric installation database 32 is in sync with mobile devices 10 managed by device management server 14. Mobile agent 20 would also maintain a list of all currently disabled newly installed applications resident in device infrastructure 23 and could make that disable list available to device management server 14 (e.g. via scan collection agent 24) upon request. One example advantage of maintaining this disable list is that new versions of a currently disabled application could not be installed and executed while the older version is still in quarantine, as mobile agent 20 could check the currently disabled list content for older versions before removing a newer version from quarantine based on the authorization decision instruction received from decision module 28.

At step 106, scan collection agent 24 could update what applications are installed and executable (i.e. out of quarantine) on mobile devices 10, based on the content of update messages 34 received periodically from the various mobile agents 20 of the mobile devices 10 of the environment 8. The content of the update messages 34 could be used to update the content of lists 9 stored in device centric installation database 32 and/or application approval repository 18. Also, if the application in question (either as identified in the update message 34 and/or in the authorization request 30) has not been seen before by the device management server 14 (e.g. is not identified in the list 9 content of application approval repository 18), list 9 content of application approval repository 18 can be updated to create this new application and it's status set to be "pending".

At step 107, for those applications listed in the lists 9 (e.g. as pending, as approved, or as restricted), when the administrator updates the approval status of the pending application on application approval repository 18 through administrative console 16, decision module 28 could query device-centric installation database 32 for a list of mobile devices 10 with the application installed. Then, the corresponding decision instruction (e.g. approved, restricted, required) is sent to the resulting list of devices as decision message 26 for their mobile agent 20 to act upon. Further, if the authorization/ restriction status is detected to be updated outside of this mechanism, the mobile agent 20 can immediately restore the status to be in accordance with its approval/restricted status upon receiving the decision message 26. For example, Scan collection agent 24 and/or decision module 28 could detect a mismatch between the authorization status for an application listed in list 22 of device-centric installation database 32 and list 9 of application approval repository 18. This could be consequence whereby the authorized application content of update message 34 does not match application authorization content of application approval repository 18, as may be the case for a jail broken or rooted device 10. As such, it can be an advantage to have both the list 22 maintained by mobile agent 20 and the list(s) 9 maintained by the device management server 14 in database(s) 18,32. As discussed above, list 22 is a local list of all authorized applications installed and executable (i.e. not in quarantine) on device infrastructure 23 while list(s) 9 contain application status as maintained centrally by device management server 14 for whitelisted/blacklisted/pending applications administered globally for all mobile devices 10 in environment 8 associated with enterprise 12.

As discussed above, each mobile device 10 is configured with Mobile Agent 20 for managing content of the application list 22, containing identification of all mobile applications presently installed (and/or removed) on mobile device 10, for reporting to a Scan Collection Agent 24 of the server 14, and for acting on authorization results 26 communicated to mobile device 10 from a Decision Module 28 based on an initial application change (e.g. install or remove) request 30 or scan request 34. For example, the application list 22 can be configured as including a List A having all approved applications for installation on device infrastructure 23 and thus stored in persistent storage in the device 10, or created by iterating by mobile agent 20 through all apps that are allowed to run (implicit list) by the operating system of device infrastructure 23. Application list 22 can also have a List B with all disabled/quarantined applications and thus stored in persistent storage in the device 10, or created by iterating by mobile agent 20 through all apps that are not allowed to run (implicit list) by the operating system of device infrastructure 23. Mobile agent 20 can be configured to periodically update the content of application list 22, as desired. This application list 22 can be periodically reported to decision module 28 and/or scan collection agent 24.

Mobile agent 20 can also periodically checks to see what applications are installed, changed, or otherwise removed and can create a List C (e.g. listing all installed apps during a scan/check when implemented). List C can be created by iterating through all applications in the device infrastructure 23 and stored in memory during processing. As such, by example, List C can be created during a scan by mobile agent 20 and then list C can be compared to List A. The difference between List C and A (e.g. C-A) can be represented by mobile agent 20 as potential non-compliance applications and this difference can be sent as authorization request 30 to the device management server 14 to request decision instruction 34.

Further, by example difference list created as List C differentiated by Lists A and B (e.g. C-A-B) can represent all newly installed or changed applications on device infrastructure 23. Mobile agent 20 can quarantine/disable all applications defined by difference (C-A-B) and add to List B. List C can then be discarded in memory at this point. In terms of updating procedure for application lists 22, for example, when an "approved" response 30 is sent for an application to device management server 14, the corresponding app entry can removed from list B and added to list A by mobile agent 20.

When a "disapproved" response 34 is sent for an application and received by mobile agent 20, the corresponding app entry can be removed from list B after the mobile agent 20 coordinates and implements removal of the application from device infrastructure 23. When a "pending" response 34 is sent for an app (note it's optional), the corresponding app entry can just stay in list B, as provided for by mobile agent 20.

Device Infrastructure 23

Figure 4:
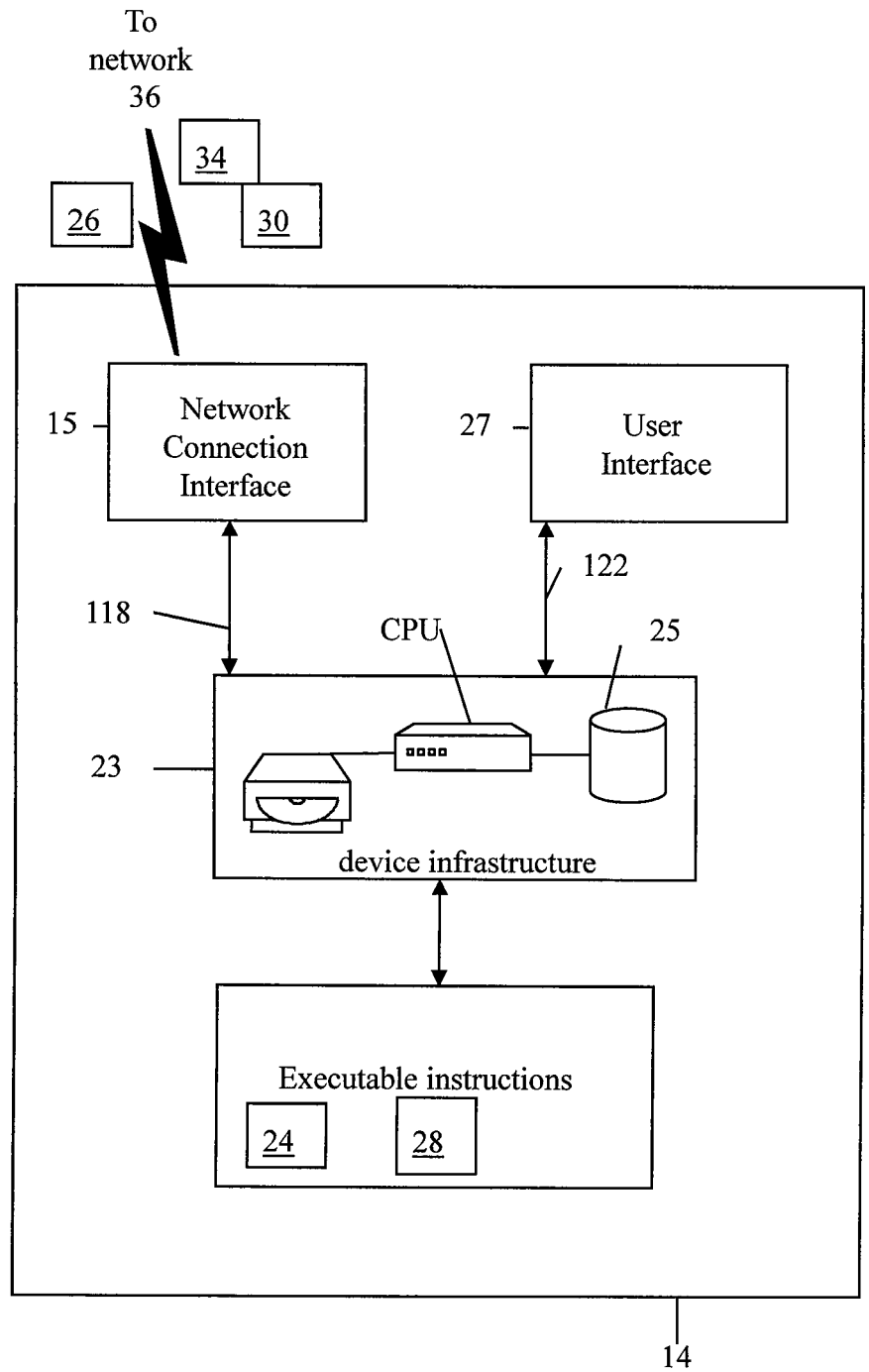
FIG. 4 shows an example configuration of a management server of the system of FIG. 1.

Referring to FIGS. 3 and 4, shown is an example device infrastructure 23 including the network connection interface 15, such as a network interface card (e.g. SIM) or a modem, coupled via connection 118 to the device infrastructure 23. The network connection interface 15 is connectable during operation of the devices 10 to the network 36 (e.g. an intranet and/or an extranet such as the Internet), which enables the devices 10,14 to communicate with each other as appropriate. The network 36 can support the communication of the messages 26,30,34 and the related content. It is recognized that the device infrastructure 23 can be implemented on mobile device 10 (FIG. 3) and server 14 (FIG. 4).

Referring again to FIGS. 3,4 the device 10,14 can also have user interface 27, coupled to the device infrastructure 23 by connection 122, to interact with a user (not shown). The user interface 27 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 23.

Referring again to FIG. 3,4 operation of the device 10,14 is facilitated by the device infrastructure 23. The device infrastructure 23 includes one or more computer processors CPU and can include an associated memory 25. The computer processor CPU facilitates performance of the device 10,14 configured for the intended task (e.g. of the respective module(s) of applications 20,24,28) through operation of the network interface 15, the user interface 27 and other application programs/hardware of the device 10,14 by executing task related instructions. These task related instructions can be provided by the operating system, and/or software applications 20,24,28 located in the memory 25, and/or by operability that is configured into the electronic/digital circuitry of the processor(s) CPU designed to perform the specific task(s). Further, it is recognized that the device infrastructure 23 can include a computer readable storage medium coupled to the processor CPU for providing instructions to the processor CPU and/or to load/update the instructions. The computer readable medium can include hardware and/or software such as, by way of example only, flash memory, optically readable medium such as CD/DVD ROMS, and memory cards. In each case, the computer readable medium may take the form of a small disk, hard disk drive, solid-state memory card, or RAM provided in the memory module 25. It should be noted that the above listed example computer readable mediums can be used either alone or in combination.

Further, it is recognized that the computing device 10,14 can include the executable applications 20,24,28 comprising code or machine readable instructions for implementing predetermined functions/operations including those of an operating system and the modules, for example. The processor CPU as used herein is a configured device and/or set of machine-readable instructions for performing operations as described by example above, including those operations as performed by any or all of the applications 20,24,28 firmware and/or operating system. As used herein, the processor CPU may comprise any one or combination of, hardware, firmware, and/or software. The processor CPU acts upon information by manipulating, analyzing, modifying, converting or transmitting information for use by an executable procedure or an information device, and/or by routing the information with respect to an output device. The processor CPU may use or comprise the capabilities of a controller or microprocessor, for example. Accordingly, any of the functionality of the modules may be implemented in hardware, software or a combination of both. Accordingly, the use of a processor CPU as a device and/or as a set of machine-readable instructions is referred to generically as a processor/module for sake of simplicity.

In view of the above descriptions of storage 25 for the computer devices 10,14 (see FIG. 3,4) can be configured as keeping the stored data (lists 9,22) in order and the principal (or only) operations on the stored data are the addition/ amendment of, processing of, or removal of the stored data from storage 25 (e.g. FIFO, LIFO, etc.). For example, storage 25 can be a linear data structure for containing and subsequent accessing of the stored data and/or can be a non-linear data structure for containing and subsequent accessing of the stored data.

Further, storage 25 receives various entities such as data that are stored and held to be processed later. In these contexts, storage 25 can perform the function of a buffer, which is a region of memory used to temporarily hold data while it is being moved from one place to another (i.e. between computer devices 10,14). Typically, the data is stored in the memory when moving the data between processes within/ between one or more computers. It is recognized that storage 25 can be implemented in hardware, software, or a combination thereof. The storage 25 is used in the network system 8 when there is a difference between the rate/time at which data is received and the rate/time at which the data can be processed (e.g. ultimately by the devices 10,14).

Further, it will be understood by a person skilled in the art that memory/storage 25 described herein is the physical place where data can be held in an electromagnetic or optical form for access by the computer processors/modules. There can be two general usages: first, memory is frequently used to mean the devices and data connected to the computer through input/ output operations such as hard disk and tape systems and other forms of storage not including computer memory and other in-computer storage such as flash memory. Second, in a more formal usage, memory/storage 25 has been divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be faster to access than secondary storage because of the proximity of the storage to the processor or because of the nature of the storage devices. On the other hand, secondary storage can hold much more data than primary storage. In addition to RAM, primary storage includes read-only memory (ROM), flash memory, and L1 and L2 cache memory. In addition to hard disks, secondary storage includes a range of device types and technologies, including diskettes, flash memory, Zip drives, redundant array of independent disks (RAID) systems, and holographic storage. Devices that hold storage are collectively known as storage media 25.

A database is one embodiment of memory 25 as a collection of information that is organized so that it can easily be accessed, managed, and updated. In one view, databases can be classified according to types of content: bibliographic, full-text, numeric, and images. In computing, databases are sometimes classified according to their organizational approach. The most prevalent approach is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. Computer databases typically contain aggregations of data records or files, such as transactions, catalogs and inventories, and profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory/storage 25 can also be defined as a physical electronic holding place for instructions and data that the computer's microprocessor can reach quickly. When the computer is in normal operation, its memory usually contains the main parts of the operating system and some or all of the application programs and related data that are being used. Memory is often used as a shorter synonym for random access memory (RAM) and/or flash memory. This kind of memory can be located on one or more microchips that are physically close to the microprocessor in the computer.

In terms of a server, it is recognised that the computer devices 14 can be configured as hardware, software, or typically a combination of both hardware and software to provide a network entity that operates as a socket listener. It is recognised that any computerised process that shares a resource (e.g. data) to one or more client processes can be classified as a server in the system 8. The term server can also be generalized to describe a host that is deployed to execute one or more such programs, such that the host can be one or more configured computers that link other computers or electronic devices together via the network 36. The computer devices 14 implementing functionality of the service can provide specialized services across the network 36 with applications executed on the devices 10, for example to private users inside a large organization or to public users via the Internet 36. In the system 8, the servers 14 can have dedicated functionality and/or can share functionality as described. Enterprise servers 14 are servers that are used in a business context and can be run on/by any capable computer hardware. In the hardware sense, the word server 14 typically designates computer models intended for running software applications under the heavy demand of a network 36 environment. In this client— server configuration one or more machines, either a computer or a computer appliance, share information with each other with one acting as a host for the other. While nearly any personal computer is capable of acting as a network or application server 14, a dedicated server 14 can contain features making it more suitable for production environments. These features may include a faster CPU, increased high-performance RAM, and typically more than one large hard drive. More obvious distinctions include marked redundancy in power supplies, network connections, and even the servers themselves.

Further to the above, in the event that mobile device 10 becomes unenrolled from environment 8, e.g. is unenrolled and thus not managed by management device server 14 (is not listed as one of the devices in device-centric installation database 32), quarantined applications can be all removed from device 10 (or all released from quarantine, if the administrator so chooses). Further, required applications (e.g. those on whitelist 9) can be allowed to be uninstalled from device infrastructure 23 upon unenrollment from management by management device server 14.

As discussed above, messaging 26,30,34 between mobile device 10 and device management server 14 are performed via network 36 such that these messages 26,30,34 are unprocessed by a network firewall associated with mobile device 10. It is recognized that it is not possible for mobile devices 10 to be protected by firewalls, which are configured to catch or otherwise identify unauthorized downloads using appropriate firewall techniques such as download filters and port traffic monitoring techniques (e.g. blacklisted traffic origination addresses). As such, it is recognized that mobile devices 10 reside outside of a firewall and thus network-based solutions using locally stored (at the mobile device 10 storage) application lists 9 cannot be practically deployed to catch unauthorized downloads.

As discussed above, device management server 14 coordinates confirming the application change event associated with device infrastructure 23 of mobile device 10 by: storing application authorization list 9 identifying the plurality of mobile applications, application authorization list 9 being remote from mobile device 10 over communications network 36; receiving application authorization request 30 from mobile device 10 over communications network 36, application authorization request 30 including application identification information; comparing the application identification information with one or more listed mobile applications of the plurality of mobile applications identified in application authorization list 30; determining whether the application information matches any of the plurality of mobile applications to produce decision instruction 26 containing an authorisation decision; and sending decision instruction 26 to mobile device 10 for subsequent processing of the decision instruction 26 by mobile agent 20 associated with device infrastructure 23; wherein processing of the decision instruction 26 provides for confirmation of the application change event.

In terms of mobile agent 20, device management server 14 coordinates confirming the application change event with mobile agent 20 of mobile device 10 including: identifying the application change event processed by device infrastructure 23; sending application authorization request 30 from mobile device 20 over communications network 36, application authorization request 30 including application identification information, receiving decision instruction 26 for processing of the decision instruction by mobile agent 20 associated with device infrastructure 23, decision instruction 26 based on the comparison of the application identification information with one or more listed mobile applications of the plurality of mobile applications identified in application authorization list 9, the application authorization list 9 identifying the plurality of mobile applications and being remote from mobile device 10 over communications network 36; and processing the authorisation decision of decision instruction 26, the authorization decision based on whether the application identification information matches any of the plurality of mobile applications in order to perform at least one of confirm or deny of the application change event.

We claim:

1. A method of maintaining mobile applications for a plurality of mobile devices, the method comprising:
   storing, at a mobile device management server, a mobile device application database identifying, for a respective mobile device of a plurality of mobile devices managed by the mobile device management server, a mobile device-specific authorization status for at least one of a plurality of mobile applications installed on the respective mobile device;
   receiving, at the mobile device management server, from a mobile device agent on the respective mobile device, an updated mobile device-specific authorization status for the at least one of the plurality of mobile applications installed on the respective mobile device, wherein the updated mobile device-specific authorization status is generated periodically by the mobile agent on the respective mobile device;
   updating, at the mobile device management server, for the respective mobile device, the mobile device application database based on the received updated mobile device-specific authorization status for the at least one of the plurality of mobile applications installed on the respective mobile device;
   accessing, by the mobile device management server, an application authorization database identifying a plurality of managed mobile applications and a managed mobile application authorization status for each of the plurality of managed mobile applications;
   determining, at the mobile device management server, for the respective mobile device, whether the updated mobile device-specific authorization status for the at least one of the plurality of mobile application installed on the respective mobile device matches a corresponding managed mobile application authorization status in the application authorization database;
   upon determining that a particular updated mobile device-specific authorization status corresponding to a particular mobile application installed on the respective mobile device does not match the corresponding managed mobile application status in the application authorization database, sending, from the mobile device management server to the mobile device agent on the respective mobile device, an application authorization update message,
   wherein the authorization update message is configured to cause the mobile device agent on the respective mobile device to change an authorization status of the particular mobile application in a mobile device application authorization database stored on the mobile device;
   receiving, at the mobile device management server, an application approval request message from the respective mobile device, the application approval request identifying a newly installed application on the respective mobile device;
   determining, at the mobile device management server, a managed mobile application status for the newly installed application in the application authorization database; and
   sending, from the mobile device management server to the mobile device agent on the respective mobile device, an application authorization update message for the newly installed application based on the managed mobile application status for the newly installed application.

2. The method of claim 1, wherein the authorization update message is configured to cause the mobile device agent on the respective mobile device to move the particular mobile application from a non-quarantine storage location to a quarantine storage location to disable user access to the particular mobile application installed on the mobile device.

3. The method of claim 1, wherein the authorization update message is configured to cause the mobile device agent on the respective mobile device to move the particular mobile application from a quarantine storage location to a non-quarantine storage location to enable user access to the particular mobile application installed on the mobile device.

4. The method of claim 1, wherein the authorization update message is configured to cause the mobile device agent on the respective mobile device to uninstall the particular mobile application from the mobile device.

5. The method of claim 1, wherein the authorization update message is configured to cause the mobile device agent on the respective mobile device to prevent execution of the particular mobile application installed on the mobile device.

6. The method of claim 1, wherein the authorization update message is configured to cause the mobile device agent on the respective mobile device to allow execution of the particular mobile application installed on the mobile device.

7. The method of claim 1, wherein the authorization update message for the newly installed application is configured to cause the mobile device agent on the respective mobile device to prevent execution of the particular mobile application installed on the mobile device.

8. The method of claim 1, wherein the authorization update message for the newly installed application is configured to cause the mobile device agent on the respective mobile device to allow execution of the particular mobile application installed on the mobile device.

9. The method of claim 1, wherein the authorization update message for the newly installed application is configured to cause the mobile device agent on the respective mobile device to move the newly installed application from a quarantine storage location to a non-quarantine storage location to allow execution of the newly installed application.

10. A non-transitory computer-readable medium comprising computer-executable instructions that, when executed by a processor in a computing device, cause the computing device to perform a method of maintaining mobile applications for a plurality of mobile devices, the method comprising:
    storing, at a mobile device management server, a mobile device application database identifying, for a respective mobile device of a plurality of mobile devices managed by the mobile device management server, a mobile device-specific authorization status for at least one of a plurality of mobile applications installed on the respective mobile device;
    receiving, at the mobile device management server, from a mobile device agent on the respective mobile device, an updated mobile device-specific authorization status for the at least one of the plurality of mobile applications installed on the respective mobile device, wherein the updated mobile device-specific authorization status is generated periodically by the mobile agent on the respective mobile device;
    updating, at the mobile device management server, for the respective mobile device, the mobile device application database based on the received updated mobile device-specific authorization status for the at least one of the plurality of mobile applications installed on the respective mobile device;
    accessing, by the mobile device management server, an application authorization database identifying a plurality of managed mobile applications and a managed mobile application authorization status for each of the plurality of managed mobile applications;
    determining, at the mobile device management server, for the respective mobile device, whether the updated mobile device-specific authorization status for the at least one of the plurality of mobile applications installed on the respective mobile device matches a corresponding managed mobile application authorization status in the application authorization database;
    upon determining that a particular updated mobile device-specific authorization status corresponding to a particular mobile application installed on the respective mobile device does not match the corresponding managed mobile application status in the application authorization database, sending, from the mobile device management server to the mobile device agent on the respective mobile device, an application authorization update message,
    wherein the authorization update message is configured to cause the mobile device agent on the respective mobile device to change an authorization status of the particular mobile application in a mobile device application authorization database stored on the mobile device;
    receiving, at the mobile device management server, an application approval request message from the respective mobile device, the application approval request identifying a newly installed application on the respective mobile device;
    determining, at the mobile device management server, a managed mobile application status for the newly installed application in the application authorization database; and
    sending, from the mobile device management server to the mobile device agent on the respective mobile device, an application authorization update message for the newly installed application based on the managed mobile application status for the newly installed application.

11. The non-transitory computer-readable medium of claim 10, wherein the authorization update message is configured to cause the mobile device agent on the respective mobile device to move the particular mobile application from a non-quarantine storage location to a quarantine storage location to disable user access to the particular mobile application installed on the mobile device.

12. The non-transitory computer-readable medium of claim 10, wherein the authorization update message is configured to cause the mobile device agent on the respective mobile device to move the particular mobile application from a quarantine storage location to a non-quarantine storage location to enable user access to the particular mobile application installed on the mobile device.

13. The non-transitory computer-readable medium of claim 10, wherein the authorization update message is configured to cause the mobile device agent on the respective mobile device to uninstall the particular mobile application from the mobile device.

14. The non-transitory computer-readable medium of claim 10, wherein the authorization update message is configured to cause the mobile device agent on the respective mobile device to prevent execution of the particular mobile application installed on the mobile device.

15. The non-transitory computer-readable medium of claim 10, wherein the authorization update message is configured to cause the mobile device agent on the respective mobile device to allow execution of the particular mobile application installed on the mobile device.

16. The non-transitory computer-readable medium of claim 10, wherein the authorization update message for the newly installed application is configured to cause the mobile device agent on the respective mobile device to prevent execution of the particular mobile application installed on the mobile device.

17. The non-transitory computer-readable medium of claim 10, wherein the authorization update message for the newly installed application is configured to cause the mobile device agent on the respective mobile device to allow execution of the particular mobile application installed on the mobile device.

18. The non-transitory computer-readable medium of claim 10, wherein the authorization update message for the newly installed application is configured to cause the mobile device agent on the respective mobile device to move the newly installed application from a quarantine storage location to a non-quarantine storage location to allow execution of the newly installed application.

\* \* \* \* \*

UNITED STATES PATENT AND TRADEMARK OFFICE
CERTIFICATE OF CORRECTION

| | | |
|---|---|---|
| PATENT NO. | : 9,305,162 B2 | Page 1 of 1 |
| APPLICATION NO. | : 13/955622 | |
| DATED | : April 5, 2016 | |
| INVENTOR(S) | : Chun Fung Yuen et al. | |

It is certified that error appears in the above-identified patent and that said Letters Patent is hereby corrected as shown below:

Claims

Column 18, Line 26, In Claim 1, delete "application;" and insert -- applications --, therefor.

Signed and Sealed this
Seventh Day of June, 2016

Michelle K. Lee
*Director of the United States Patent and Trademark Office*